Patented Feb. 19, 1935

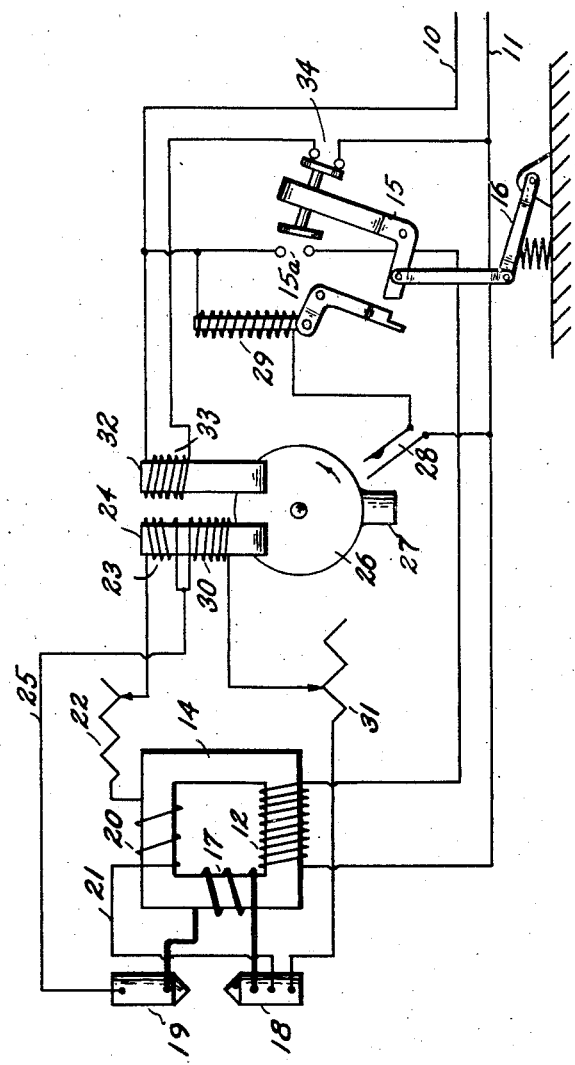

1,991,414

UNITED STATES PATENT OFFICE 1,991,414

ELECTRIC WELDING

Mackworth G. Rees, Detroit, Mich.

Application January 11, 1934, Serial No. 706,214

20 Claims. (Cl. 219—4)

The inventions of this application relate to improvements in the art of electric welding and particularly provide novel control systems for welding apparatus.

One invention is fundamentally based upon the belief that in welding parts to one another, the duration of the weld or the welding period should be increased above a predetermined or preset normal welding period in the event the welding current for a particular weld is below a predetermined or preset normal welding current. It is believed that if for any reason whatever, as for example, if there are dirty or oxidized electrodes or parts, etc., the welding current is below the preselected current, then the duration of the weld should be increased above the preselected duration of weld so as to compensate for such decrease in current, to the end that the energy expended in a high resistance or low current weld should be at least as much as that expended in a standard resistance and current weld. The principal object of this invention, therefore, is to provide in conjunction with welding apparatus, a system for increasing the duration of the weld above a predetermined or preselected welding period, in the event the welding current is below the preselected welding current.

It has been found in the use of welding apparatus equipped with a system of this invention that it is desirable to have the welding period increase in more than a direct proportion to the decrease in current, and a second invention aims to provide in a system as above described means whereby the welding period will increase in what is over and above a direct proportion to the decrease in the welding current, both the increase in welding period and the decrease in welding current being measured from a predetermined or preselected standard for each of these factors. For example, whenever during a run of two-sheet welds, there is presented a three sheet weld, the means of this invention automatically operates, due to the fact that a three sheet weld has a greater resistance than a two sheet weld, to increase the welding period, to the end that at least as much energy will be expended for a three sheet weld as is expended for the two sheet welds.

In order to perform the object of the second invention, there is combined with the means of the first invention, namely the means for increasing the welding period in the event the welding current is below normal, a corrective means whose effect is to enhance the welding-period-increasing effect of the means for increasing the welding period. At times, however, it may be considered desirable to have the corrective means rendered inactive, or act in such a way as to oppose the welding-period-increasing effect of the means for increasing the welding period; and for this reason, it is contemplated to have the corrective means manually adjustable so that its effect may be operable to increase the period, or to decrease the period, or rendered inoperable.

In the preferred embodiment of the invention, a rotary motor is used as the timing means. Inasmuch as it is desired to return the motor to its starting position, after each welding operation, motor return means are provided. One object of this invention is to provide an electrical motor return means.

Further aspects of the inventions of this application will readily be understood upon reference to the following detailed descriptive matter and to the appended drawing which shows a welding system constructed in accordance with the inventions hereof.

In the drawing,

The single figure is a simplified diagram of a welding system constructed to increase the welding period from normal in the event the welding current is below normal and provided with a corrective coil which insures the welding period increasing faster than the welding current decreases and provided with an electrical return means for the timing motor employed in the system.

Referring to the single figure it will be seen that there is shown a welding system having power lines 10—11 connected to the primary 12 of the welding transformer whose core is referenced 14, there being a circuit breaker 15, which is indicated as being actuated for closing the primary circuit through contacts 15a by the pedal 16 under the control of the welding operator. The welding transformer is equipped with the usual secondary coil 17 connected to the welding electrodes 18 and 19.

Combined with the parts heretofore described is a timing motor circuit which includes a tertiary coil 20 wound on the transformer core 14 and preferably having the same number of turns as the secondary. One side of the tertiary coil 20 is connected by the lead 21 to the welding electrode 18; its other side is connected through a variable presettable resistance 22 to a timing motor coil 23 wound around a core 24 to produce a timing motor magnet; the coil 23 has its other end connected to the electrode 19 through the lead 25. The complete circuit from electrode 19 to electrode 18 through coils 20 and 23 is to be known as the timing motor circuit, and it will be observed that when the welding current is turned on to start a weld, that the timing motor magnet 23—24 is energized to constitute a counterclockwise rotating influence or torque for the rotatably mounted timing motor disc 26. This disc has an arm 27 which serves to close the contacts 28 which are in series with an opening coil 29 for the primary circuit breaker 15, the coil 29 and its contacts 28 being across the power lines.

When the timing motor magnet is energized, it causes the disc 26 to rotate counterclockwise and energize the coil 29 to open the circuit breaker and cut off the welding current and thus end the welding period. The interval of rotation of the disc 26, which is the welding period, is determined by and is inversely related to the strength of the coil 23, and due to the manner in which this coil is connected, namely through the tertiary coil 20 and thus across the electrodes 18, 19, the strength of this coil varies with the welding current. Therefore, when the welding current is normal, the coil 23 is strong enough to cause the welding period to be of normal duration; however, in the event the welding current is below normal, the strength of coil 23 is below normal, and consequently the welding period is increased above normal more or less proportionately.

Now, while it is theoretically possible to have the welding period increased above normal in a direct ratio to the amount that the welding current has decreased, it has been found desirable as a practical matter to have the welding period increase in a more than direct proportion to or faster than the decrease in welding current. For example, if the welding current decreases from the normal by one-half, the welding period should be increased to more than twice the normal welding period. For this reason there is provided an auxiliary circuit, to be known as a timing motor corrective circuit, and including a corrective coil 30 wound on the timing motor magnet core 24 and connected across the electrodes 18, 19, through the medium of a variable resistance 31. The provision of this coil 30, which is so wound as to oppose the coil 23, insures the welding period being increased faster than the current decreases, the corrective effect of coil 30 increasing as the welding current decreases.

In the system shown, there is provided a return magnet circuit for the timing motor disc 26 and such return magnet circuit will now be described. It includes a return magnet core 32 which is provided with a return magnet coil 33 connected across the power lines through the medium of contacts 34 which are closed when the breaker 15 is opened. The return magnet circuit automatically returns the disc 26 at the end of the welding period, being energized simultaneously with and upon the opening of the primary circuit breaker 15.

In order to show that the welding period will increase (assuming the corrective circuit omitted) as the welding current decreases, the following will be offered, it being understood that no exact mathematical relations are being claimed.

The E. M. F. across coil 23 is equal to the open circuit voltage (a constant) minus the voltage drop across the electrodes. Therefore, the E. M. F. across coil 23 decreases from the open circuit voltage as the voltage drop across the electrodes increase. Since the voltage drop across the electrodes increases as the welding current decreases, the E. M. F. across coil 23 decreases as the welding current decreases.

Now, since the strength of coil 23 and consequently the speed of rotation of disc 26 decreases as the E. M. F. across coil 23 decreases, that speed will decrease as the welding current decreases. Consequently, the welding period (an inverse of the speed) will increase as the welding current decreases.

The corrective circuit will enhance the foregoing result by imposing a corrective influence which increases as the welding current decreases, and this may be proven as follows:

The corrective influence will increase as the strength of coil 30 increases, and this strength increases as the voltage drop across the electrodes increases. Since the latter increases as the welding current decreases, the corrective influence will increase as the welding current decreases.

The net counterclockwise torque on disc 26 is the resultant of the fundamental influence of coil 23 (for rotation counterclockwise) and of corrective influence of coil 30 (in opposition).

It will be observed from the foregoing, that there is used a "direct" motor on an "inverse" circuit. By this is meant, the motor is one whose speed decreases as the E. M. F. across the motor decreases, or as the current through the motor decreases, and that the timing motor circuit is so arranged that its E. M. F. or the timing motor current decreases as the voltage drop across the weld increases, or as the welding current decreases. As an alternative to the use of a "direct" motor on an "inverse" circuit, it might be possible to use an "inverse" motor on a "direct" circuit, or a motor whose speed decreases as the E. M. F. across the motor increases, or a timing motor circuit whose E. M. F. increases as the voltage drop across the weld increases, or as the welding current decreases.

For example, a shunt wound D. C. motor might be used as the timing motor, in which case, the armature would be connected to an external D. C. or constant current, and its field coils would be connected (through a suitable rectifying means) across the welding electrodes. A characteristic of such a motor is that its speed is directly (more or less) proportional to its field strength. Therefore, when the field strength increases, as on a drop in welding current and a rise in voltage drop across the electrodes, the motor would slow down. Consequently, the welding period would increase from normal as the welding current decreased from normal.

To show that the timing motor circuit shown, namely the circuit employing the tertiary coil 20 and the timing motor coil 23, and connected across the electrodes 18—19, is truly an inverse circuit with respect to the welding electrodes, the following analysis of the circuit is offered.

The circuit from electrode 19 by way of the timing motor coil 23 and the tertiary coil 20 to electrode 18 is a no-voltage-loss circuit, when and since there is no load thereon. Accordingly the potential of that circuit, at electrode 18, will always be the open circuit voltage.

The circuit from electrode 19 by way of the secondary coil 17 to electrode 18 is a voltage loss circuit, when and since, there is a load thereon;

and the loss in this circuit varies with the decrease in welding current from normal.

Since the potential difference for the timing motor coil will be the resultant obtained by subtracting the voltage loss in the loss-circuit from the constant or no-load voltage, it will be seen that as the loss increases, that resultant will decrease, and vice versa. Therefore, the relation between that resultant or the coil potential and the voltage loss (or the drop across the electrodes) is not a direct one, with one increasing as the other does, but is truly an inverse one, with one (the timing motor voltage) decreasing as the other (the welding drop) increases.

The function of the tertiary coil can now be understood. The tertiary coil functions to create a no-loss circuit for the timing motor coil, having a potential which does not vary with the load or the welding current or the drop across the electrodes. In other words, the tertiary coil creates the "high" potential from which the welding drop may be subtracted to obtain, as a resultant, the E. M. F. for the timing coil.

It will be understood at this time that it is not intended to ascribe any mathematical exactness or accuracy to the foregoing discussions, for various factors may impair exact relations between voltage drops, speeds, currents, etc. It is intended merely that the relations are such that one element, voltage drop, speed, etc., will increase or decrease at the time that the other element is increasing or decreasing; however, the increase or decrease in one element may or may not be exactly proportional to the increase or decrease in the other.

Further, it will be observed that by virtue of the fact that the timing motor is influenced by conditions existent in the secondary, rather than by conditions existent in the primary, the timing adjustment is not dependent upon the flow of current in the transformer, but is dependent only on the power component of that current, namely the welding current. Accordingly, no error in timing is inherent to the device, by virtue of low power factors common to welding circuits, as would be true if the timing motor were influenced by the primary. Thus it will be seen, that the system shown, wherein the voltage drop for the timing motor is dependent on the voltage drop across the weld, measured at the weld, truly creates the desired result of having the welding period vary inversely with the welding current.

It will be observed that the parts shown may be considered as a meter for showing the heat-time units (watt-hours) in a weld. It is apparent that the timing coil circuit forms the essential element of a true ampere-hour meter and that the corrective coil circuit forms the essential element of a true voltage-hour meter. Since the disc is influenced by the resultant of these two circuits, the two circuits together form the essential element of an ampere voltage-hour meter or what is more commonly known as a watt-hour meter.

Now having described the illustrated embodiment of the various inventions intended to be covered in this application, reference is had to the appended claims for a determination of the scope of inventions claimed.

I claim:

1. For electric welding transformer-type apparatus employing a primary, a secondary, and welding electrodes, a control system operating to increase the welding period above a normal welding period in the event the welding current is below a normal welding current, comprising an electrically operated timing means for determining the welding period and constructed to increase the welding period above normal in the event the voltage across the timing means is below normal, and a timing circuit for said timing means connected to the welding transformer and constructed to have its own voltage, which is the voltage across the timing means, assume a below normal voltage in the event the welding current is below normal.

2. For electric welding transformer-type apparatus employing a primary, a secondary, and welding electrodes, a control system operating to increase the welding period above a normal welding period in the event the welding current is below a normal welding current, comprising an electrically operated timing means for determining the welding period and constructed to increase the welding period above normal in the event the voltage across the timing means is below normal, and a timing circuit for said timing means connected to the welding transformer and constructed to have its own voltage, which is the voltage across the timing means, assume a below normal voltage in the event the welding current is below normal, the timing circuit including a transformer coil portion and a timing motor coil, in series, with each other, and together placed across part of the secondary circuit.

3. For electric welding transformer-type apparatus employing a primary, a secondary, and welding electrodes, a control system operating to increase the welding period above a normal welding period in the event the welding current is below a normal welding current, comprising an electrically operated timing means for determining the welding period and constructed to increase the welding period above normal in the event the voltage across the timing means is below normal, and a timing circuit for said timing means connected to the welding transformer and constructed to have its own voltage, which is the voltage across the timing means, assume a below normal voltage in the event the welding current is below normal, the timing circuit including a transformer coil portion and a timing motor coil, in series, with each other, and together placed across part of the secondary corcuit, with one connection for the timing circuit being at a welding electrode.

4. For electric welding transformer-type apparatus employing a primary, a secondary, and welding electrodes, a control system operating to increase the welding period above a normal welding period in the event the welding current is below a normal welding current, comprising an electrically operated timing means for determining the welding period and constructed to increase the welding period above normal in the event the voltage across the timing means is below normal, and a timing circuit for said timing means connected to the welding transformer and constructed to have its own voltage, which is the voltage across the timing means, assume a below normal voltage in the event the welding current is below normal, the timing circuit including a transformer coil portion and a timing motor coil, in series, with each other, and together placed across part of the secondary circuit, with both connections for the timing circuit being at both welding electrodes.

5. For electric welding transformer-type apparatus employing a primary, a secondary, and welding electrodes, a control system operating to increase the welding period above a normal welding period in the event the welding current is below a normal welding current, comprising an electrically operated timing means for determining the welding period and constructed to increase the welding period above normal in the event the voltage across the timing means is below normal, and a timing circuit for said timing means connected to the welding transformer and constructed to have its own voltage, which is the voltage across the timing means, asume a below normal voltage in the event the welding current is below normal, the timing circuit including a tertiary transformer coil and a timing motor coil, in series with each other, and together placed across part of the secondary circuit.

6. For electric welding transformer-type apparatus employing a primary, a secondary, and welding electrodes, a control system operating to increase the welding period above a normal welding period in the event the welding current is below a normal welding current, comprising an electrically operated timing means for determining the welding period and constructed to increase the welding period above normal in the event the voltage across the timing means is below normal, and a timing circuit for said timing means connected to the welding transformer and constructed to have its own voltage, which is the voltage across the timing means, assume a below normal voltage in the event the welding current is below normal, the timing circuit including a tertiary transformer coil and a timing motor coil, in series with each other, and together placed across part of the secondary circuit, with one connection for the timing circuit being at a welding electrode.

7. For electric welding transformer-type apparatus employing a primary, a secondary, and welding electrodes, a control system operating to increase the welding period above a normal welding period in the event the welding current is below a normal welding current, comprising an electrically operated timing means for determining the welding period and constructed to increase the welding period above normal in the event the voltage across the timing means is below normal, and a timing circuit for said timing means connected to the welding transformer and constructed to have its own voltage, which is the voltage across the timing means, assume a below normal voltage in the event the welding current is below normal, the timing circuit including a tertiary transformer coil and a timing motor coil, in series with each other, and together placed across part of the secondary circuit, with both connections for the timing circuit being at both welding electrodes.

8. For electric welding transformer-type apparatus employing a primary, a secondary, and welding electrodes, a control system operating to increase the welding period above a normal welding period in the event the welding current is below a normal welding current, comprising an electrically operated timing means for determining the welding period and constructed to increase the welding period above normal in the event the voltage across the timing means is below normal, and a timing circuit for said timing means connected to the welding transformer and constructed to have its own voltage, which is the voltage across the timing means, assume a below normal voltage in the event the welding current is below normal, the timing circuit being regulated by the voltage drop across the weld, measured at the weld.

9. For electric welding transformer-type apparatus employing a primary, a secondary, and welding electrodes, a control system operating to increase the welding period above a normal welding period in the event the welding current is below a normal welding current, comprising a timing circuit connected to the welding transformer and constructed to have its own voltage assume a below normal voltage in the event the welding current is below normal, a corrective circuit connected to the welding transformer and constructed to have its own voltage assume an above normal voltage in the event the welding current is below normal, and a timing means energized by the two aforementioned circuits and constructed to vary the welding period in accordance with the resultant of the effects of those two circuits.

10. For electric welding transformer-type apparatus employing a primary, a secondary, and welding electrodes, a control system operating to increase the welding period above a normal welding period in the event the welding current is below a normal welding current, comprising a timing circuit connected to the welding transformer and constructed to have its own voltage assume a below normal voltage in the event the welding current is below normal, a corrective circuit connected to the welding transformer and constructed to have its own voltage assume an above normal voltage in the event the welding current is below normal, and a timing means energized by the two aforementioned circuits and constructed to increase the welding period above normal in the event that the effect of the timing circuit is greater than the effect of the corrective circuit or to decrease the welding period below normal in the event that the effect of the corrective circuit is greater than that of the timing circuit, the degree of increase or decrease of the welding period being proportionally related to the resultant obtained by subtracting the lesser effect from the greater effect.

11. For electric welding transformer-type apparatus employing a primary, a secondary, and welding electrodes, a control system operating to increase the welding period above a normal welding period in the event the welding current is below a normal welding current, comprising an electrically operated timing means for determining the welding period and constructed to increase the welding period above normal in the event the current flow in the timing means is below normal, and a timing circuit for said timing means connected to the welding transformer and constructed to have its current flow, which is the current flow for the timing means, assume a below normal current in the event the welding current is below normal.

12. A construction of the character specified in claim 1 wherein the timing means is in the nature of a timing motor which operates during the weld and after an interval causes termination of the weld, and electrically operated means operating automatically at the termination of the weld for reversing the movement of said motor and restoring it to its original or starting position.

13. A construction of the character specified in claim 2 wherein the timing means is in the nature of a timing motor which operates during the weld, and after an interval causes termination of the weld, and electrically operated means operating automatically at the termination of the weld for reversing the movement of said motor and restoring it to its original or starting position.

14. For electric welding transformer-type apparatus employing a primary, a secondary, and welding electrodes, a control system operating to increase the welding period above a normal welding period in the event the welding current is below a normal welding current, comprising an electrically operated timing motor which terminates the weld at the end of its movement, and means responsive to the welding current for causing movement of said motor, and operating to cause the motor movement to be of longer duration when the welding current is below normal than when it is not below normal, the means comprising a timing circuit including a tertiary transformer coil and a timing motor coil, in series with each other, and together placed across part of the transformer secondary circuit.

15. For electric welding transformer-type apparatus employing a primary, a secondary, and welding electrodes, a control system operating to increase the welding period above a normal welding period in the event the welding current is below a normal welding current, comprising an electrically operated timing motor which terminates the weld at the end of its movement, and means responsive to the welding current for causing movement of said motor, and operating to cause the motor movement to be of longer duration when the welding current is below normal than when it is not below normal, the means comprising a timing circuit including a tertiary transformer coil and a timing motor coil, in series with each other, and together placed across part of the transformer secondary circuit, with one connection for the timing circuit being at a welding electrode.

16. For electric welding transformer-type apparatus employing a primary, a secondary, and welding electrodes, a control system operating to increase the welding period above a normal welding period in the event the welding current is below a normal welding current, comprising an electrically operated timing motor which terminates the weld at the end of its movement, and means responsive to the welding current for causing movement of said motor, and operating to cause the motor movement to be of longer duration when the welding current is below normal than when it is not below normal, the means comprising a timing circuit including tertiary transformer coil and a timing motor coil, in series with each other, and together placed across part of the transformer secondary circuit, with both connections for the timing circuit being at both welding electrodes.

17. For electric welding transformer type apparatus employing a primary, a secondary, and welding electrodes, a control system operating to control the welding period in inverse correspondence to fluctuations in the welding heat and comprising time controlling means electrically operated by means connected across the welding electrodes, and responsive directly to the resultant of the weld current and the voltage drop across the welding electrodes and including a tertiary coil independent of the primary and secondary and wound around the transformer core and connected across the electrodes.

18. For electric welding transformer type apparatus employing a primary, a secondary, and welding electrodes, a control system operating to control the welding period in inverse correspondence to fluctuations in the welding heat and comprising time controlling means electrically operated by means connected across the welding electrodes and including a tertiary coil independent of the primary and secondary and wound around the transformer core and connected across the electrodes.

19. For electric welding transformer type apparatus employing a primary, a secondary, and welding electrodes, a control system operating to control the welding period in inverse correspondence to fluctuations in the welding heat and comprising time controlling means including two timing coils connected across the welding electrodes, with one of them having in series connection therewith a tertiary coil independent of the primary and secondary and wound around the transformer core.

20. For electric welding transformer type apparatus employing a primary, a secondary, and welding electrodes, a control system operating to control the welding period in inverse correspondence to fluctuations in the welding heat and comprising time controlling means including two oppositely acting timing coils connected across the welding electrodes, with one of them having in series connection therewith a tertiary coil independent of the primary and secondary and wound around the transformer core.

MACKWORTH G. REES.